United States Patent [19]

Ishimoto

[11] Patent Number: 5,484,321
[45] Date of Patent: Jan. 16, 1996

[54] RADIO-CONTROLLED TRACK VEHICLES

[75] Inventor: Zenichi Ishimoto, Tokyo, Japan

[73] Assignee: Nikko Co., Ltd., Tokyo, Japan

[21] Appl. No.: 832,571

[22] Filed: Feb. 7, 1992

[51] Int. Cl.$^6$ .......................... A63H 17/14; B62D 55/205; F16H 7/02
[52] U.S. Cl. ........................ 446/433; 305/35 EB; 305/57; 474/153; 474/901
[58] Field of Search .................................. 446/433, 434, 446/431, 454, 456, 459, 465, 470; 180/7.2; 305/35 EB, 36 R, 56, 57; 474/153, 901, 188, 189

[56] References Cited

U.S. PATENT DOCUMENTS

| | | |
|---|---|---|
| D. 139,803 | 12/1944 | Henry . |
| D. 225,660 | 12/1972 | Satoh . |
| D. 232,113 | 7/1974 | Daniel . |
| D. 232,573 | 8/1974 | Daniel . |
| D. 238,195 | 12/1975 | Morrison . |
| 1,303,764 | 5/1919 | Broadway ............... 180/7.2 |
| 2,244,528 | 6/1941 | Schur ..................... 446/433 |
| 2,770,977 | 11/1956 | Beckadolph et al. . |
| 2,832,426 | 4/1958 | Seargeant ............ 446/433 X |
| 3,338,107 | 8/1967 | Kickhaefer ............. 474/153 |
| 3,472,563 | 10/1969 | Irgens ..................... 305/57 |
| 3,486,574 | 12/1969 | Baron ..................... 305/57 |
| 3,514,962 | 6/1970 | Poole .................. 180/7.2 X |
| 3,575,474 | 4/1971 | Russ ................... 474/901 X |
| 3,722,962 | 3/1973 | Cooper ................ 474/901 X |
| 3,900,231 | 8/1975 | Ohm .................... 305/35 EB |
| 3,948,110 | 4/1976 | Lassanske ........... 474/901 X |
| 4,072,062 | 2/1978 | Morling et al. ...... 474/153 X |
| 4,218,932 | 8/1980 | McComber ........ 305/35 EB X |
| 4,231,182 | 11/1980 | Kurita ..................... 446/433 |
| 4,338,042 | 7/1982 | Biancale et al. ...... 180/7.2 X |
| 4,458,444 | 7/1984 | Avery et al. . |
| 4,571,224 | 2/1986 | Aringa ..................... 474/153 |
| 5,013,286 | 5/1991 | Breher ................ 474/153 X |
| 5,135,427 | 8/1992 | Suto et al. ............... 446/433 |

FOREIGN PATENT DOCUMENTS

| | | |
|---|---|---|
| 487395 | 6/1918 | France . |
| 499974 | 2/1920 | France . |
| 1012231 | 7/1957 | Germany . |
| 55-79764 | 6/1980 | Japan . |
| 142960 | 5/1920 | United Kingdom . |

*Primary Examiner*—Robert A. Hafer
*Assistant Examiner*—D. Neal Muir
*Attorney, Agent, or Firm*—Young & Thompson

[57] ABSTRACT

An improved radio-controlled track-driven vehicle comprises an innovative belt drive structure in which the rear wheels engage with the belt in positive drive, and the front wheels engage with the belt in frictional drive. According to one embodiment of the invention, the drive belt has taller central teeth that are received within a central groove of the front and rear wheels, and shorter lateral teeth that mesh with complementary toothed regions of the rear wheels and frictionally contact corresponding smooth cylindrical surfaces of the front driven wheels. In another embodiment of the invention, the belt teeth extend transversely across most of the width of the belt, with alternate teeth having disposed thereon a taller central tooth to be received within the wheel grooves.

7 Claims, 4 Drawing Sheets

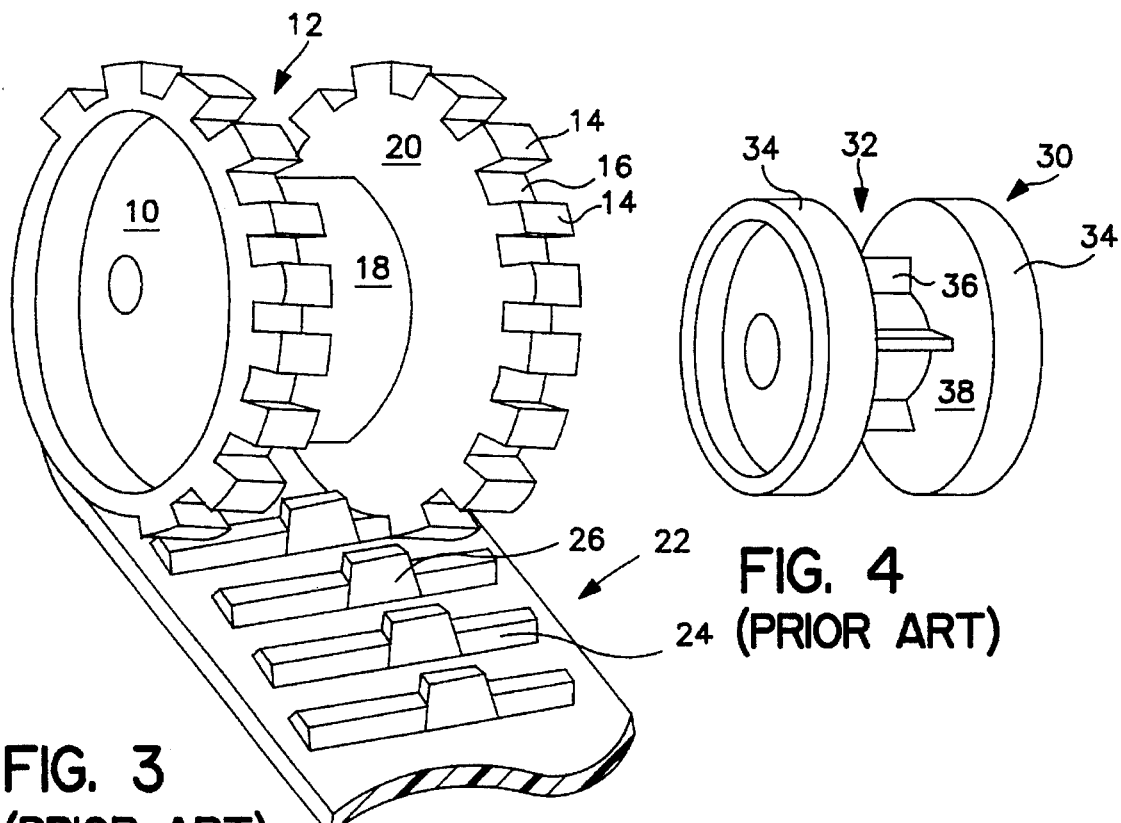
FIG. 3 (PRIOR ART)
FIG. 4 (PRIOR ART)
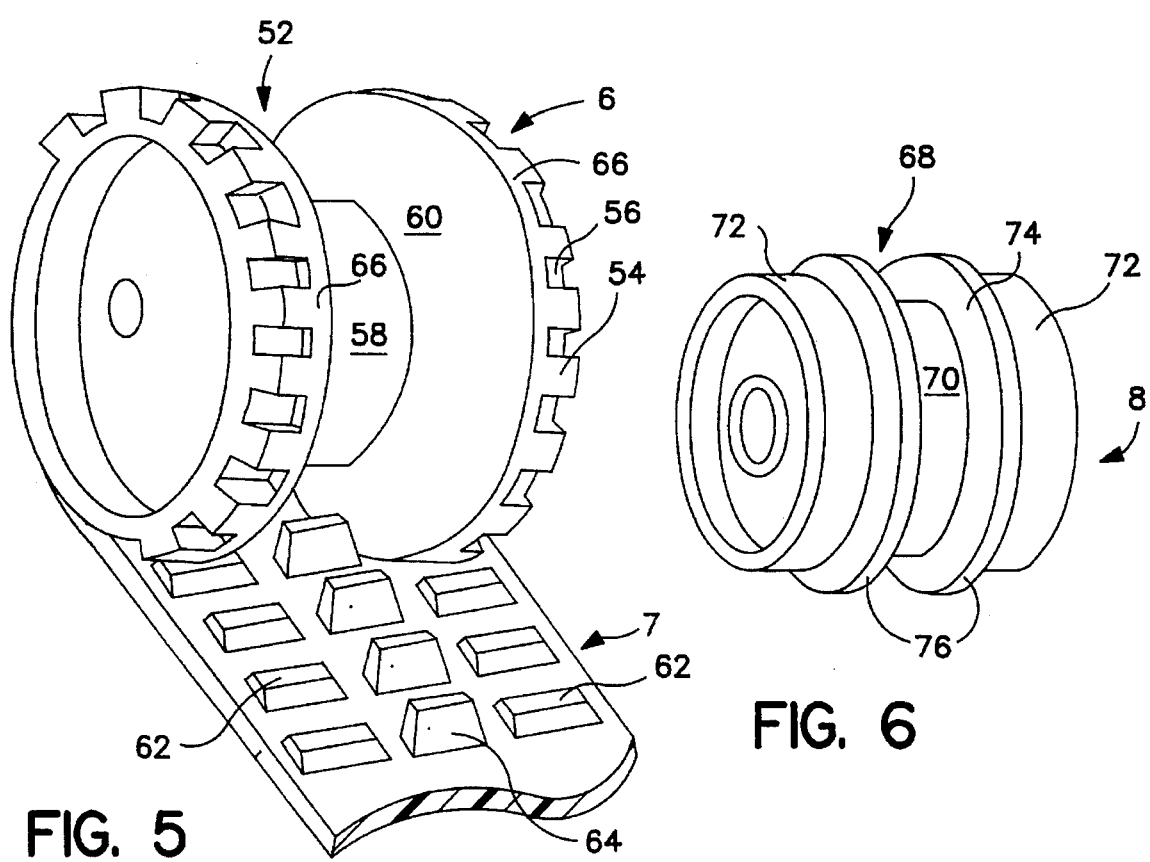
FIG. 5
FIG. 6

RADIO-CONTROLLED TRACK VEHICLES

BACKGROUND OF THE INVENTION

1. Field of the Invention

The present invention relates to track-driven toy vehicles, and more particularly to such vehicles having at least one electric motor that is controlled by radio signals issuing from a hand-held transmitter.

2. Description of the Prior Art

Track-driven toy vehicles are well known in the art. Generally, such vehicles comprise a pair of endless toothed belts, one on each side of the vehicle, which travel about front and rear wheels. French patent No. 499,974 and British patent No. 142,960 show examples of such toy vehicles, in which it will be noted that the diameter of the rear wheels is substantially greater than that of the front wheels.

More recently, radio-controlled track-driven toy vehicles have been introduced on the market by various manufacturers. These toy vehicles typically comprise a pair of independently operable electric motors each of which actuates a rear drive wheel of the vehicle. The rear drive wheels, as well as the front driven wheels of these prior art vehicles, have toothed surfaces, and mesh with the toothed inner surfaces of a pair of endless belts connecting the front and rear wheels on each side of the vehicle.

With particular reference to FIGS. 3 and 4, which show the wheel and track configurations of a conventional such vehicle, the rear wheel 10 is divided by a central annular groove 12 into a pair of radially outwardly extending toothed surfaces each comprising a circular array of teeth 14. Between each pair of adjacent teeth 14 will be found a recess 16 delimiting the teeth. The smooth cylindrical base of the central recess 12 is indicated at 18 in FIG. 3. From this base there rises on each side of groove 12 a radial shoulder 20 that is integral with teeth 14 and recesses 16. According to the prior art construction, this radial shoulder 20 rises only to the base of the recesses 16 and teeth 14.

Rear drive wheel 10 meshes with an endless drive belt 22 that travels about the rear drive wheel 10 and its respective front driven wheel 30 (see FIG. 4). Drive belt 22 has formed on its inwardly-directed surface an endless row of teeth, wherein the side portions 24 of the teeth are substantially shorter than the central portions 26.

It will be appreciated from the above description and the accompanying FIG. 3 that, as belt 22 meshes with and travels about drive wheel 10, the shorter side portions 24 of the belt teeth will be engaged in the recesses 16 between adjacent wheel teeth 14, such that the wheel 10 will drive the belt 22.

On the other hand, the taller central portions 26 of the belt teeth will be received within the central groove 12 of wheel 10. The reception of the taller central portions 26 within groove 12 does not much contribute to the driving of the belt 22 by wheel 10, but rather serves to guide the belt 22 in its travel about wheel 10, and retain the belt 22 in meshing engagement with the wheel 10.

FIG. 4 shows the prior art driven front wheel that is used together with the belt and rear wheel of FIG. 3. The prior art front wheel 30 likewise has a central groove 32 whose width is about the same as that of the central groove 12 of the rear wheel 10. The central groove 32 of front wheel 30 divides the front wheel into two radially outwardly extending annular portions 34. However, unlike the corresponding portions of the rear wheel 10, the annular portions 34 of front wheel 30 are smooth, and have no teeth.

Conversely, the base of groove 32 comprises a circular series of radially outwardly extending teeth 36, unlike the corresponding groove base 18 of rear wheel 10, which is smooth. It will be noted that the radially outwardly extending teeth 36 of front wheel 30 extend between and interconnect the radially extending shoulders 38 defining groove 32.

As the drive belt 22 travels about the front wheel 30, the shorter side portions 24 of the belt teeth contact, but of course do not mesh with, the smooth surfaces 34. Conversely, the taller central portions 26 of the belt teeth are in continuous meshing engagement with the central teeth 36 formed within groove 32.

Thus, the drive arrangement in the prior art toy vehicles of this type provides a positive belt drive at the rear, and similarly a positive belt drive at the front.

In toy vehicles of this type, the power is supplied independently to each of the rear wheels, which power input is variable in both the forward and reverse directions. Accordingly, there is no need to provide for any separate steering of the toy vehicle, as steering is effected by driving. For example, a relatively greater power input to the left rear wheel causes the vehicle to turn toward the right. Similarly, full forward power to the left rear wheel simultaneously with full reverse power to the right rear wheel causes the vehicle to spin like a top in the clockwise direction as viewed from above.

SUMMARY AND OBJECTS OF THE INVENTION

The prior art radio-controlled track-driven vehicles described above suffer the disadvantage that the drive belts tend to disengage from the drive wheels during use, due to the high driving torques applied to the rear wheels, as well as the irregular surfaces on which such track-driven vehicles are operated.

It is of course a major inconvenience when one or both of the drive belts of such a vehicle becomes disengaged from the wheels, because this necessarily involves an interruption of the playing time as well as the cumbersome operation of stretching the belt back into proper meshing engagement with the wheels. Moreover, as the radio transmitter used for such toy vehicles will frequently have an effective range of 30 meters or beyond, it then becomes a further inconvenience for the operator to have to go and fetch the disabled vehicle before the drive belts can be manually re-engaged.

It is accordingly a principal object of the present invention to provide a radio-controlled track-driven vehicle in which the drive belts are more reliably engaged on the drive wheels, such that the drive belts do not readily disengage from the drive wheels during ordinary use of the toy.

It is a further object of the invention to provide innovative meshing wheel and belt structures that improve the driving engagement and reliable registration of the drive belts on such a toy vehicle.

It is a yet further object of the invention to embody the construction principles promoting improved track retention in a variety of toy vehicles offering a corresponding variety of performance options and play experiences.

It is a still yet further object of the invention to combine the inventive belt drive principles herein with other disparate devices for propelling the vehicles.

The above and other objects of the invention are achieved by an improved radio-controlled track-driven toy vehicle in which the front wheels of the vehicle are caused to have no teeth, such that the engagement of the drive belt therewith is frictional rather than positive. It has been found that by providing a positive meshing engagement between the belt drive and the rear teeth on the one hand, and a frictional non-meshing engagement of the drive belt with the front teeth on the other hand, the retention of the drive belts on the wheels is greatly improved even when the vehicle is operated very roughly.

Also according to the invention, the central groove dividing the rear drive wheel into radially outwardly extending toothed regions is defined by a pair of opposed radial shoulders that extend to the tops of the wheel teeth, rather than to the base of the wheel teeth as in the prior art. Corresponding to this modified wheel structure, the drive belts to be used in the vehicles of the present invention comprise three separate aligned rows of teeth, with the central row of teeth being taller than the side rows of teeth.

In a further embodiment of the invention, the rear drive wheels are configured as in the prior art, however, these wheels are caused to cooperate with a novel belt structure wherein a row of teeth of uniform height extend transversely over the majority of the width of the belt, but wherein alternate such teeth comprise a taller central portion secured thereto.

In various further embodiments of the invention, the novel belt drive principles enumerated above are used in conjunction with disparate ground-engaging elements, such as conventional ground-engaging front wheels for the vehicle, or a pair of parallel, oppositely-rotating auger elements.

BRIEF DESCRIPTION OF THE DRAWINGS

The above and further objects and advantages of the invention will be more readily apparent from a reading of the following detailed discussion taken with reference to the accompanying drawings, in which:

FIG. 3 is a perspective view, partially broken away, of a prior art combination of a rear drive wheel and drive belt;

FIG. 4 is a perspective view of a prior art front driven wheel adapted to cooperate with the rear wheel/drive belt combination of FIG. 3;

FIG. 5 is a perspective view corresponding to the view of FIG. 3, but showing a rear wheel/drive belt combination according to an embodiment of the present invention;

FIG. 6 is a perspective view of a front driven wheel according to the present invention, adapted to cooperate with the drive belt of FIG. 5;

DETAILED DISCUSSION

Figure 1:
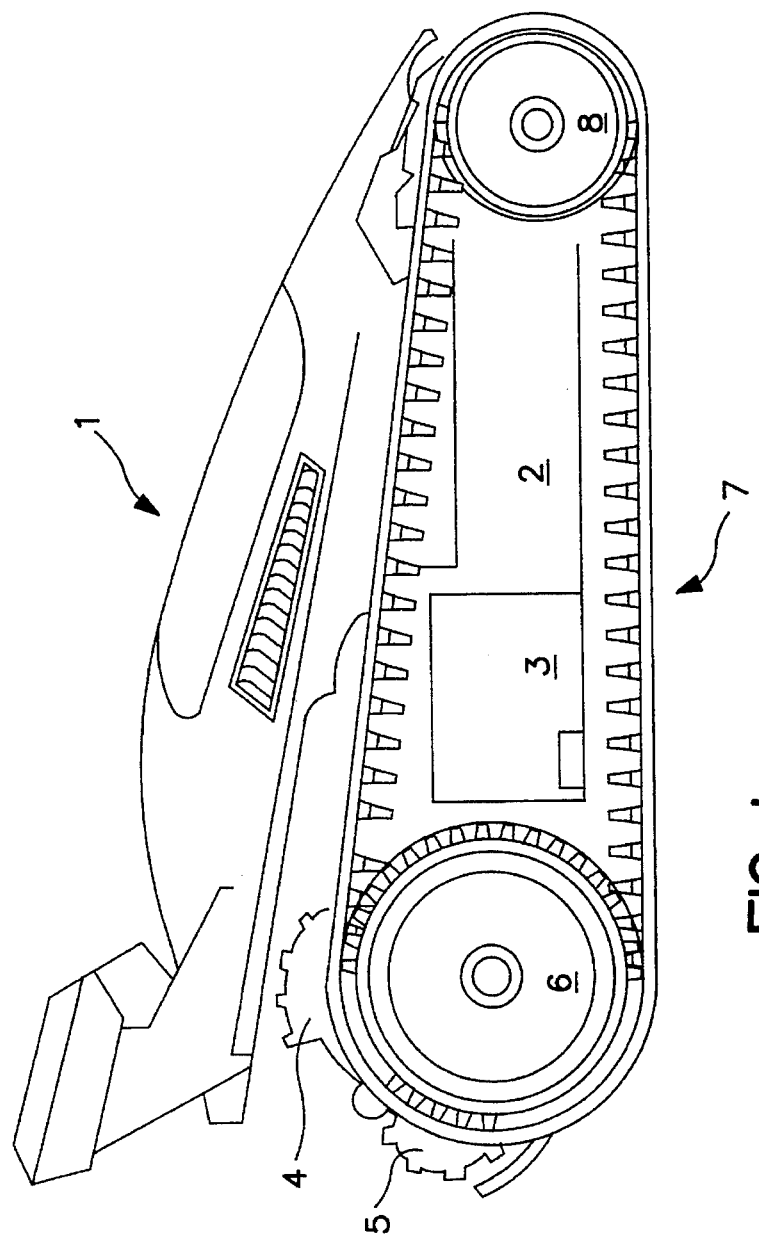
FIG. 1 is a side elevational view of a track-driven radio-controlled toy vehicle according to the present invention.

Referring now to FIG. 1, shown therein is a radio-controlled track-driven toy vehicle according to the present invention, in which a body unit 1 of molded plastic is secured for example by screws to a lower chassis unit 2, also made of molded plastic. It will be noted that the vehicle shown in FIG. 1 is generally symmetrical about a longitudinal plane bisecting the vehicle, such that a left-side view of the vehicle would essentially be a mirror image of the depicted right-side view.

Formed integrally with the lower chassis 2 is a battery receptacle 3, which in this embodiment is adapted to receive a rechargeable 9.6-volt nickel-cadmium battery pack for powering the electric motors to be described later.

The battery receptacle 3, together with the connection plug for connecting the battery pack to the circuitry of the vehicle, may advantageously be as described in commonly-owned U.S. Pat. No. 5,061,579, which issued Oct. 29, 1991. Accordingly, the disclosure of that patent is hereby expressly incorporated by reference for a full description of a battery receptacle and connections which may be used in the vehicles according to the invention.

A pair of electric motors 4, 5 are mounted between the rear drive wheels 6 of the vehicle, with each of the motors 4, 5 driving a respective one of the rear wheels 6. The motors 4, 5, the rear drive wheels 6, as well as the drive axles (not shown) transmitting the output of the motors 4, 5 to the wheels 6 together form a modular assembly that is pivotally mounted to the remainder of the chassis 2, about a transverse pivot axis disposed just to the rear of the battery receptacle 3. This pivotal mounting of the modular rear drive assembly being conventional in radio-controlled vehicles having ground-engaging wheels, it need not be described in detail here.

The vehicle shown in FIG. 1 also comprises a pair of drive belts 7, one on each side of the vehicle, each of the drive belts 7 travelling about and engaging a respective one of the rear wheels 6, as well as a respective one of the front driven wheels 8. The particular structure of the wheels 6, 8 and drive belt 7 will be described in greater detail below in connection with FIGS. 5 and 6.

Although the upper body portion 1 of the vehicle in FIG. 1 has in this embodiment a sleek racing appearance, it will be appreciated that the shape of the upper body portion does not affect the performance of the vehicle and may be varied at will as a matter of design choice to include any desired shape, such as for example a pick-up truck.

Figure 2:
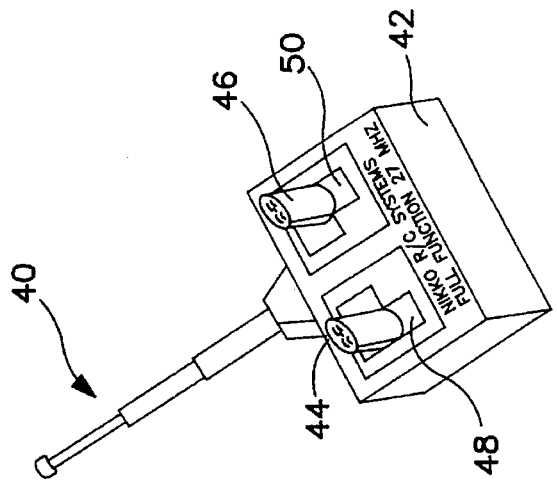
FIG. 2 is a perspective view of a hand-held transmitter adapted to control the toy vehicles according to the invention.

FIG. 2 shows a hand-held radio transmitter/controller that is suitable for use in operating the toy vehicle of FIG. 1, as well as the toy vehicles according to the other embodiments of the invention. The transmitter comprises an antenna 40, a housing 42, and left and right control sticks 44 and 46, respectively.

The housing 42 comprises on its underside a cover (not shown), and is adapted to receive a 9-volt battery. The left and right control sticks 44 and 46 are arranged to move independently forward and backward within their respective slots 48 and 50. It will be noted that the control slots 48 and 50 comprise an inwardly directed portion at the full forward range of their travel, corresponding to a "TURBO" mode or some other radio signal that will cause the respective electric motors 4 and 5 to operate at a higher output.

In operation, the user will activate the toy vehicle by turning on a switch (not shown) disposed on the underside of the lower chassis 2. After first placing the vehicle on the ground, the vehicle can be caused to move by pushing the control sticks 44 and 46 of the transmitter forward and/or backward. For example, pushing control stick 44 forward will cause electric motor 4 to rotate the left-side rear drive wheel 6 in the clockwise direction, and, similarly, pushing control stick 46 forward will cause electric motor 5 to rotate right-side drive wheel 6 in the clockwise direction. Pushing control sticks 44 and 46 forward simultaneously to the same extent thus causes the vehicle to advance with alacrity in a straight line. As discussed above in connection with the prior art, the direction of the vehicle can be changed by varying the extent to which one control stick is pushed relative to the other, thereby causing the electric motors 4 and 5 to have differing outputs.

It will here be noted that the twin radio transmitter/receiver circuits to be used in conjunction with the embodiments of FIGS. 1 and 2 may be as are conventional in the art, and so need not be described in detail here. As an example of receiver/transmitter circuitry that may be used to advantage in the present invention, there can be mentioned the radio-control circuitry described in commonly-owned U.S. Pat. No. 5,088,955, which issued Feb. 18, 1992. Although that patent describes the transmitter/receiver circuitry in connection with a vehicle sound-effect generation system, the toy vehicles according to the present invention may or may not include such sound effect generation, as desired.

Moreover, it will be appreciated that the dual independent control of electric motors 4 and 5 entails as a conventional matter dual transmitter/receiver circuitry in which the actuating waveforms of the respective engines have been suitably differentiated from one another.

FIGS. 5 and 6 show in detail the structure of the rear drive wheels 6, drive belt 7 and front driven wheels 8 of the embodiment of FIG. 1. For purposes of comparison, these views are shown in the same perspective and style as the corresponding prior art structure of FIGS. 3 and 4 that has been described above.

With reference to FIG. 5, it will be seen that the rear wheel 6 comprises a central annular groove 52 that divides the wheel 6 into a pair of opposed, radially-outwardly extending toothed portions each having a circular series of teeth 54 alternating with recesses 56. The central annular groove 52 is defined by its smooth cylindrical base 58, and the pair of opposed radial shoulders 60 extending at right angles thereto. It will be appreciated that only one of the pair of shoulders 60 is visible in FIG. 5, due to the perspective view; however, the wheel 6 of FIG. 5 is essentially symmetrical about a radial bisecting plane.

According to this embodiment of the invention, each of the pair of opposed radial shoulders 60 extends beyond the recesses 56 to the summits of the teeth 54. This is in contrast to the rear drive wheel of the prior art as shown in FIG. 3, wherein the radial shoulders 20 extend only to the bases of the teeth 14. Thus, the recesses 56 according to the invention are segregated from and do not communicate with the central annular groove 52, in contrast to the prior art recesses 16 which communicate with the central annular grove 18. The recesses 56 according to the invention are thus closed on three sides, and open on only that side which faces axially outward of the wheel.

Correspondingly, the drive belt 6 according to the embodiment of FIG. 5 comprises three distinct rows of teeth for engagement with the drive wheel 6. In particular, the drive belt 7 comprises two lateral rows of shorter teeth 62, and a central row of taller teeth 64. This is in contrast to the drive belt 22 according to the prior art of FIG. 3, wherein the lateral portions 24 are contiguous with the central portions 26.

As the drive belt 7 according to the invention engages with the drive wheel 6, the central row of taller teeth 64 is received within the central annular groove 52, and aids in maintaining the belt 7 in continuous meshing engagement with the wheel 6. Likewise, the teeth 54 and recesses 56 engage the lateral rows of shorter teeth 62, and aid in transmitting the output of each motor 4, 5 from the respective wheel 6 to the respective belt 7.

In addition, according to the invention, there is defined on each wheel a pair of radially projecting annular rims 66, which contact the drive belt 7 in between the lateral rows of shorter teeth 62 and the central row of taller teeth 64, and which further aid in maintaining the correct registration of each drive belt 7 on its corresponding drive wheel 6.

It has therefore been found according to this embodiment of the invention that the structure of FIG. 5 greatly improves the retention of the drive belt 7 on the drive wheel 6, thereby correspondingly decreasing the occurrence of the drive belt 7 becoming disengaged from the drive wheels during use of the toy vehicle. This benefit is provided by the enhanced registration promoted through the annular rims 66 contacting the planar belt portions in between the lateral and central rows of teeth, as well as by providing the belt teeth in the form of three separate rows which thereby serve better to preserve the inherent resiliency and recovery capability of the belt 7.

FIG. 6 shows the front driven wheel that is used together with the drive belt/rear wheel combination of FIG. 5. As shown in FIG. 6, the central annular groove 68 of front wheel 8 is defined in part by a smooth cylindrical bottom 70, in contrast to the central teeth 36 occupying the corresponding groove 32 in the prior art front wheel 30.

Like the prior art front wheel 30, the front wheel 8 according to this embodiment of the invention comprises a pair of radially outwardly extending smooth cylindrical surfaces 72 on either side of the central groove 68. However, unlike the prior art front wheel 30, the radial shoulders 74 defining the central groove 68 extend outward beyond the smooth surfaces 72, to define a pair of radially-projecting rims 76.

As the drive belt 7 engages the front driven wheel 8, the central row of taller teeth 64 will be received within the central groove 68, the width of groove 68 being about the same as that of groove 52 in the rear wheels 6. The lateral rows of shorter teeth 62 will be in frictional contact with the smooth surfaces 72, whereas the pair of rims 76 will contact the planar longitudinal strips of drive belt 7 in between the central row of taller teeth 64 and the lateral rows of shorter teeth 62.

The drive belt 7 thus securely engages with the front driven wheel 8, notwithstanding that there are no teeth on front driven wheel 8 with which the teeth of belt 7 can engage. The drive train shown in FIGS. 5 and 6 thus comprises a positive belt drive at the rear wheels, and a frictional belt drive at the front wheels, in contrast to the prior art.

It has been found that this arrangement is particularly advantageous in maintaining the drive belts in proper engagement with the front and rear wheels 6, 8. It is believed that this improved performance results from the ability of belt 7 to slip slightly on the front wheels 8, when the vehicle strikes a low obstacle or encounters a particularly bumpy ground surface.

Figure 7:
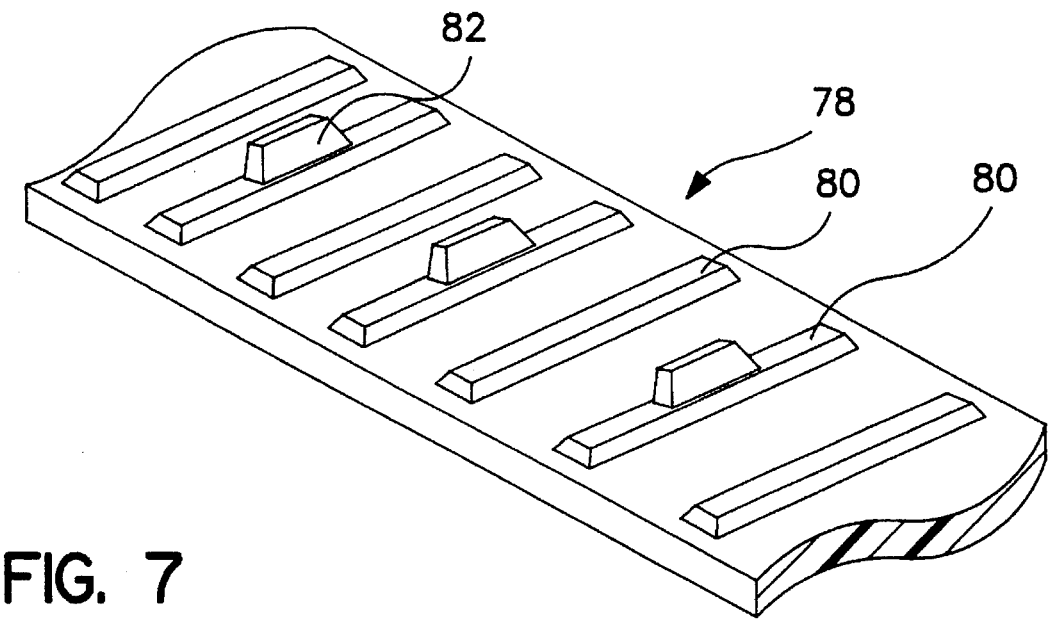
FIG. 7 is a fragmentary perspective view of a drive belt according to a further embodiment of the invention.

FIG. 7 shows a drive belt 78 according to a further embodiment of the invention. It will be noted that, as with the drive belt 7 of FIG. 5, the ground-engaging surface of drive belt 78 is not visible in this view. However, it will be appreciated by those skilled in the art that the outwardly-facing ground-engaging surface of the endless drive belts in this and the other embodiments according to the invention will preferably be formed with a series of transversely extending ribs, to promote the traction of the vehicle on irregular surfaces.

The belt 78 of FIG. 7 comprises a series of teeth 80 which extend transversely over the majority of the width of belt 78. Since the teeth 80 span the width of belt 78, it will be appreciated that the belt 78 could not be used in conjunction with the wheel 6 of FIG. 5, due to the presence of the radially projecting rims 66 segregating recesses 56 from groove 52. Instead, the belt 78 of FIG. 7 is used in conjunction with a drive wheel such as the prior art wheel 10 of FIG. 3, thereby producing a novel combination according to a further embodiment of the present invention.

It will be observed in FIG. 7 that alternate belt teeth 80 have formed on a central portion thereof a secondary tooth 82. The width of the secondary teeth 82 is slightly less than that of the groove 12 of wheel 10, such that the teeth 82 are received within the groove 12 and aid in maintaining the drive belt 78 in correct registration with the wheel 10. The front driven wheel to be used in conjunction with the belt 78 of this embodiment will be as shown in FIG. 6, except that the radial shoulders 74 of groove 68 will extend only to the smooth surfaces 72, such that the radially projecting rims 76 will not be present.

When the invention is embodied in a vehicle having belts of the type shown in FIG. 7, it has been found that the continuous extent of the belt teeth spanning the width of the belt promotes improved retention of the belts to the wheels, as well as smooth transmission of power.

Figure 8:
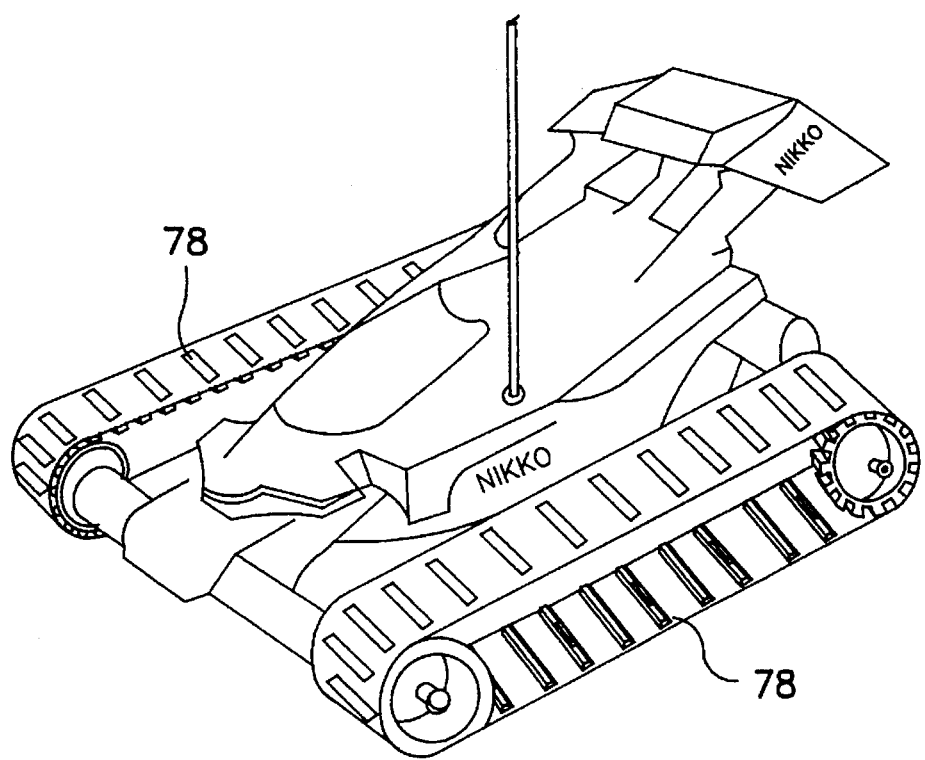
FIG. 8 is a perspective view showing the overall appearance of a track-driven radio-controlled toy vehicle employing the drive belt of FIG. 7.

FIG. 8 shows in perspective an example of a radio-controlled track-driven vehicle employing the belts 78 according to FIG. 7, in conjunction with rear drive wheels such as that shown in FIG. 3, and front driven wheels such as those described above in connection with this embodiment.

Figure 9:
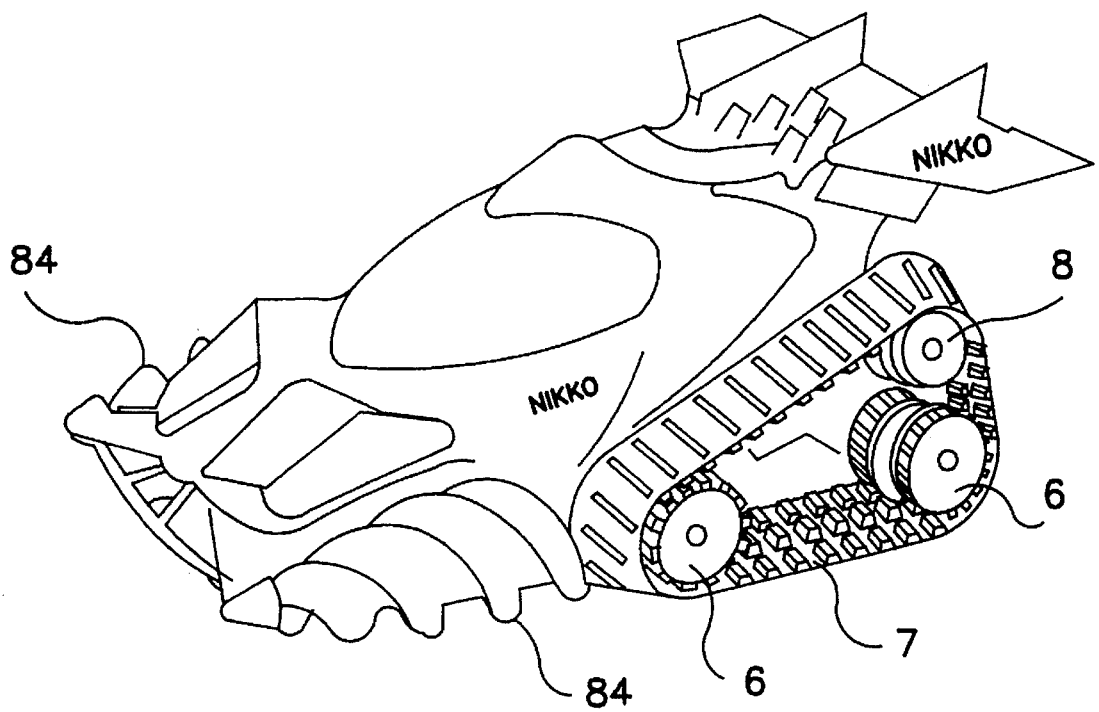
FIG. 9 is a perspective view of a toy vehicle employing a modified form of the drive belt arrangement of FIGS. 5 and 6, in combination with a pair of oppositely rotating auger elements.

FIG. 9 shows a radio-controlled track-driven vehicle according to another embodiment of the invention, in which the belt drive principles described above are combined with disparate traction elements in the form of a pair of oppositely-rotating auger elements 84. It will be noted that the vehicle shown in FIG. 9 is substantially symmetrical about a longitudinal bisecting plane.

The belt drive arrangement of FIG. 9 employs a drive belt 7 as shown and described in connection with FIG. 5, together with two toothed wheels 6 such as those shown in FIG. 5, and one driven wheel 8 as shown in FIG. 6. As noted above, the belt drive structure shown on the left side of the vehicle in FIG. 9 is duplicated on the right side of the vehicle.

The auger elements 84 of FIG. 9 are mounted for rotation about parallel axes extending in the direction of travel of the vehicle. These auger elements may be idly mounted, in which case they will be caused to turn solely by frictional engagement of the elements 84 with the ground surface as the vehicle is propelled forward by the belt drive assemblies. Alternatively, the auger elements 84 may be themselves driven by the electric motor(s) of the vehicle, via suitable power transmission components (not shown).

Figure 10:
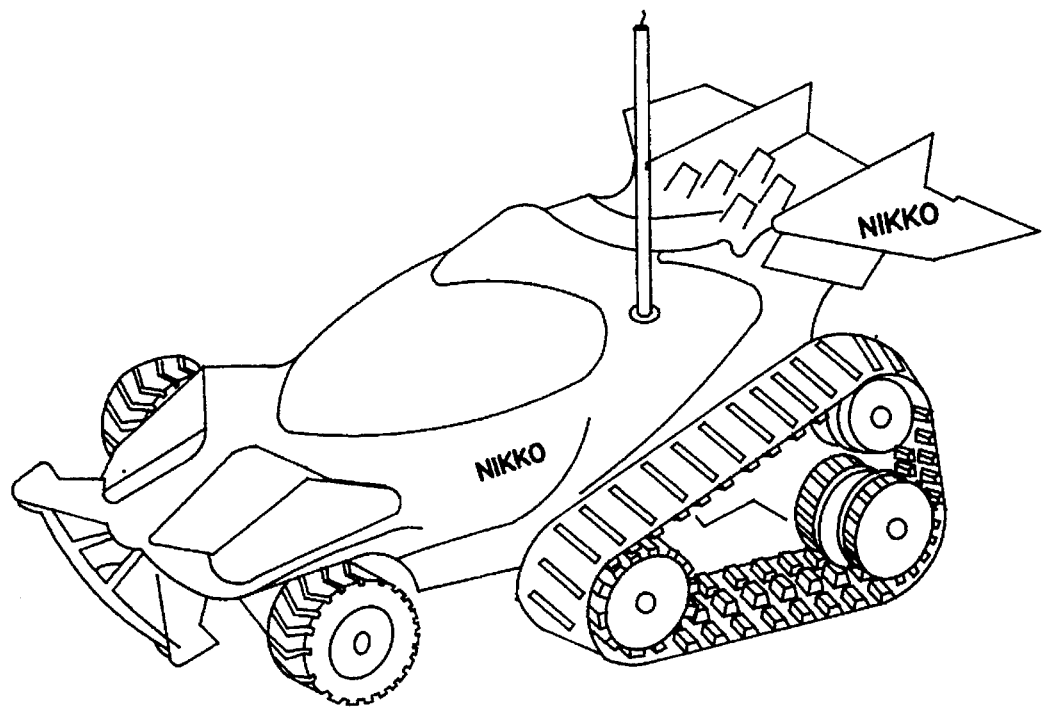
FIG. 10 is a perspective view of a toy vehicle similar to that of FIG. 9, but in which the auger elements have been replaced by a set of ground-engaging front wheels.

FIG. 10 shows a toy vehicle according to a still further embodiment of the invention. This vehicle is identical to that shown in FIG. 9, except that the auger elements 84 of that figure are replaced by a set of conventional ground-engaging front wheels 86. These wheels will typically be idly mounted, although it is possible also to drive the front wheels via the electric motors to produce all-wheel drive. An advantage of this embodiment is that the vehicle may include a steering mechanism and servo motor for the front ground-engaging wheels, with a separate steering control being provided on the hand-held transmitter. In this way, the vehicle combines the "off road" capability provided by the track drives with a conventional steering control for the vehicle.

Although the present invention has been described in connection with various preferred embodiments thereof, it will be appreciated that these embodiments have been provided solely for purposes of illustration, and should not be construed as limiting the scope of the invention as set forth in the appended claims.

What is claimed is:

1. A radio-controlled track-driven toy vehicle, comprising a vehicle chassis having at least one electric motor, a pair of circular rear drive wheels driven by said at least one electric motor, a pair of front driven wheels, and a pair of endless drive belts each travelling about a respective one of said rear drive wheels and front driven wheels, wherein said rear drive wheels each comprise a central circumferential groove dividing said rear drive wheels into a pair of opposed radially-outwardly extending annular portions comprising wheel teeth alternating with recesses, said central cylindrical groove of said rear drive wheels being defined by a pair of opposed radial shoulders extending radially outwardly to the radially outermost surfaces of said wheel teeth, thereby segregating said recesses from said groove, said drive belts each comprising two rows of lateral belt teeth meshing with said wheel teeth and a third row of central belt teeth being received within said central recess, each of said two rows of lateral belt teeth being displaced from said third row of central teeth, thereby defining a longitudinally extending flat belt region between the third row of central teeth and each of the two rows of lateral teeth, said front driven wheels comprising a central circumferential groove dividing each of said front wheels into a pair of opposed radially-outwardly extending portions having smooth cylindrical surfaces.

2. The vehicle according to claim 1, wherein said third row of central belt teeth is taller than said two rows of lateral belt teeth.

3. The vehicle according to claim 1, wherein the central cylindrical groove of said front driven wheels is defined by a pair of opposed radial shoulders extending beyond said opposed smooth cylindrical surfaces, thereby defining a pair of annular rims projecting radially outwardly beyond said smooth cylindrical surfaces.

4. The vehicle according to claim 1, wherein said vehicle further comprises a pair of ground-engaging members mounted forwardly of said front driven wheels.

5. The vehicle according to claim 4, wherein said pair of ground-engaging members are oppositely-rotating auger elements mounted for rotation about parallel axes extending in the direction of travel of said vehicle.

6. The vehicle according to claim 4, wherein said pair of ground-engaging members are a pair of freely rotatably mounted ground-engaging wheels.

7. The vehicle according to claim 1, wherein said at least one electric motor is a pair of electric motors, each of said pair of electric motors driving a respective one of said rear drive wheels.

* * * * *